United States Patent
Dawson et al.

(10) Patent No.: US 7,729,951 B2
(45) Date of Patent: Jun. 1, 2010

(54) METHOD, SYSTEM, AND COMPUTER PROGRAM PRODUCT FOR A DYNAMIC VIRTUAL SHOPPING AREA BASED ON USER PREFERENCES AND HISTORY

(75) Inventors: Christopher J. Dawson, Arlington, VA (US); Peter G. Finn, Brampton (CA); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 11/832,251

(22) Filed: Aug. 1, 2007

(65) Prior Publication Data

US 2009/0037291 A1 Feb. 5, 2009

(51) Int. Cl.
  *G06Q 30/00* (2006.01)
  *G06F 17/30* (2006.01)
(52) U.S. Cl. .......................................... 705/26; 705/27
(58) Field of Classification Search .............. 705/26–27
  See application file for complete search history.

(56) References Cited

U.S. PATENT DOCUMENTS

| 6,014,638 | A * | 1/2000 | Burge et al. ................... 705/27 |
| 2002/0113809 | A1* | 8/2002 | Akazawa et al. ............ 345/706 |
| 2005/0177463 | A1* | 8/2005 | Crutchfield et al. ........... 705/27 |
| 2006/0122917 | A1* | 6/2006 | Lokuge et al. ................ 705/27 |
| 2007/0101276 | A1* | 5/2007 | Yuen ........................... 715/757 |
| 2007/0150368 | A1* | 6/2007 | Arora et al. ................... 705/26 |
| 2007/0179867 | A1* | 8/2007 | Glazer et al. .................. 705/27 |
| 2008/0091553 | A1* | 4/2008 | Koski ........................... 705/26 |
| 2008/0195507 | A1* | 8/2008 | Ratnakar ...................... 705/27 |

OTHER PUBLICATIONS

"3Dshopping.com Adds New Web Mail Clients and Expands Relationships With Existing Clients". Business Wire. Oct. 11, 1999. p. 0153, 2 pgs [recovered from Dialog on Dec. 22, 2009].*

* cited by examiner

*Primary Examiner*—Jeffrey A Smith
*Assistant Examiner*—Kathleen Davison
(74) *Attorney, Agent, or Firm*—William Schiesser; Hoffman Warnick LLC

(57) ABSTRACT

The present invention is directed to a dynamic virtual shopping area based on user preferences and history. A method for providing a dynamic virtual shopping area in accordance with an embodiment of the present invention includes: capturing user preferences; and dynamically customizing a virtual shopping area for an avatar based on the user preferences, such that the avatar is presented with items the avatar is more likely to purchase upon entering the virtual shopping area.

10 Claims, 5 Drawing Sheets

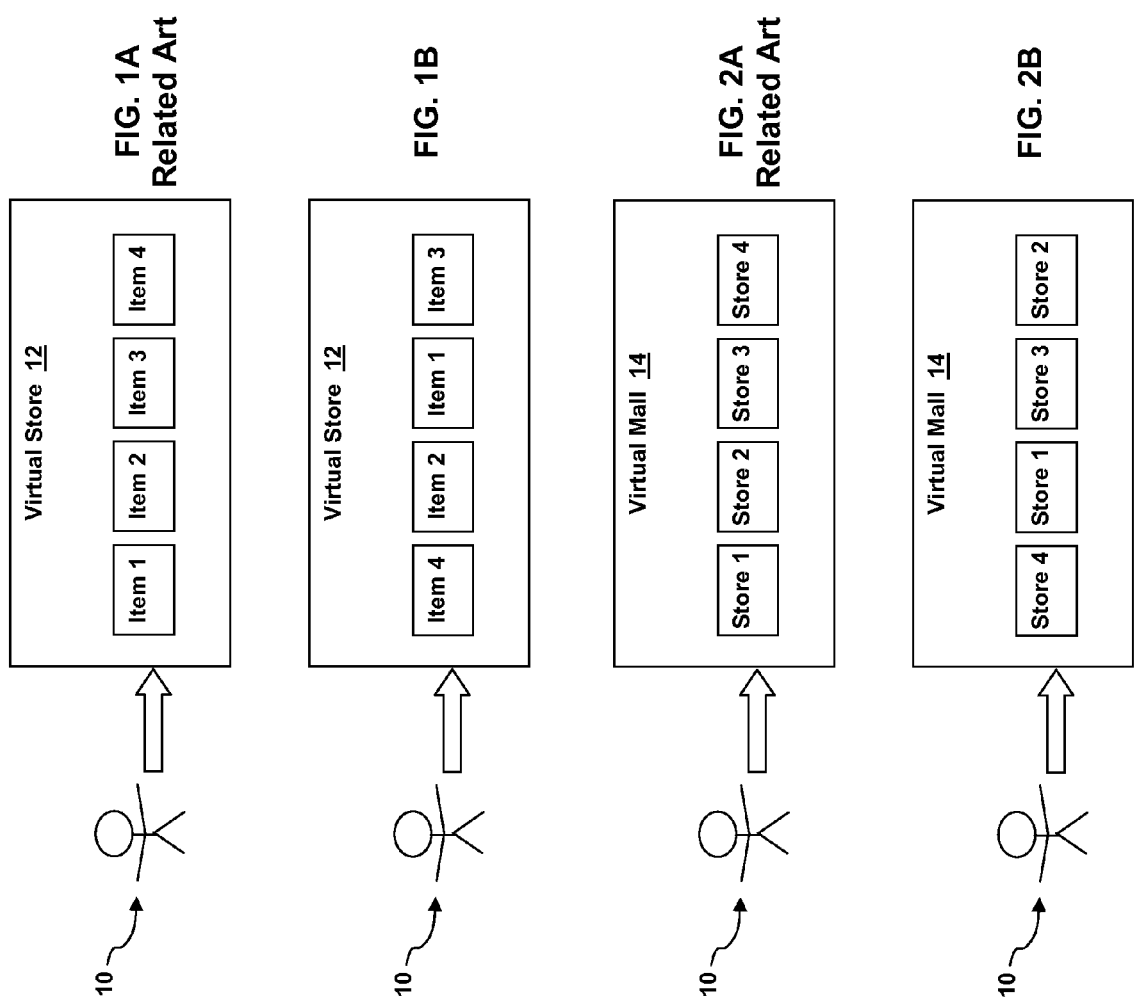

METHOD, SYSTEM, AND COMPUTER PROGRAM PRODUCT FOR A DYNAMIC VIRTUAL SHOPPING AREA BASED ON USER PREFERENCES AND HISTORY

FIELD OF THE INVENTION

The present invention relates to marketing, and more specifically relates to a dynamic virtual shopping area based on user preferences and history.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in it's virtual economy.

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new marketing methods and mechanisms.

All types of business and personal activities are now performed in virtual environments such as Second Life. The visual stimulation of virtual environments is appealing to users and mundane activities can be made more enjoyable for the end user. One such area of interest is in making on-line purchases. Legacy online retailers provide search and order-entry web pages to make the purchase experience efficient and to increase cross-selling. However, such legacy two-dimensional experiences base all decision trees on icons and text based on user supplied keywords. One problem with this concept is that all users have to navigate through the same mall structure when selecting items to purchase. For example, if a user only ever shops for high definition DVDs and other electronics at a certain mall, why should that user have to search the entire mall to immediately get to the items the user is looking for? Furthermore, it is sometimes very obtrusive for current online shopping malls to aggressively suggest the other items that the user might wish to purchase. This information is sometimes seen as blatant marketing and up-selling and wastes the shopper's time. Accordingly, there is a need for a solution that addresses these and other deficiencies of the related art.

SUMMARY OF THE INVENTION

The present invention provides a dynamic virtual shopping area based on user preferences and history. In the dynamic virtual shopping area, the items that an avatar is more interested in (or may be interested in) are presented to the avatar immediately upon entering the shopping area, without being intrusive. In this disclosure, a shopping area comprises one or more stores.

A first aspect of the present invention is directed to a method for providing a dynamic virtual shopping area, comprising: capturing user preferences; and dynamically customizing a virtual shopping area for an avatar based on the user preferences, such that the avatar is presented with items the avatar is more likely to purchase upon entering the virtual shopping area.

A second aspect of the present invention is directed to a system for providing a dynamic virtual shopping area, comprising: a system for capturing user preferences; and a system for dynamically customizing a virtual shopping area for an avatar based on the user preferences, such that the avatar is presented with items the avatar is more likely to purchase upon entering the virtual shopping area.

A third aspect of the present invention is directed to a program product stored on a computer readable medium, which when executed, provides a dynamic shopping area, the computer readable medium comprising program code for: capturing user preferences; and dynamically customizing a virtual shopping area for an avatar based on the user preferences, such that the avatar is presented with items the avatar is more likely to purchase upon entering the virtual shopping area A fourth aspect of the present invention is directed to a method for deploying an application for providing a dynamic virtual shopping area, comprising: providing a computer infrastructure being operable to: capture user preferences; and dynamically customize a virtual shopping area for an avatar based on the user preferences, such that the avatar is presented with items the avatar is more likely to purchase upon entering the virtual shopping area.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 1A depicts the arrangement of items in a virtual store in accordance with the related art.

FIG. 1B depicts the arrangement of items in a virtual store in accordance with an embodiment of the present invention.

FIG. 2A depicts the arrangement of stores in a virtual mall in accordance with the related art.

FIG. 2B depicts the arrangement of stores in a virtual mall in accordance with an embodiment of the present invention.

Figure 3:
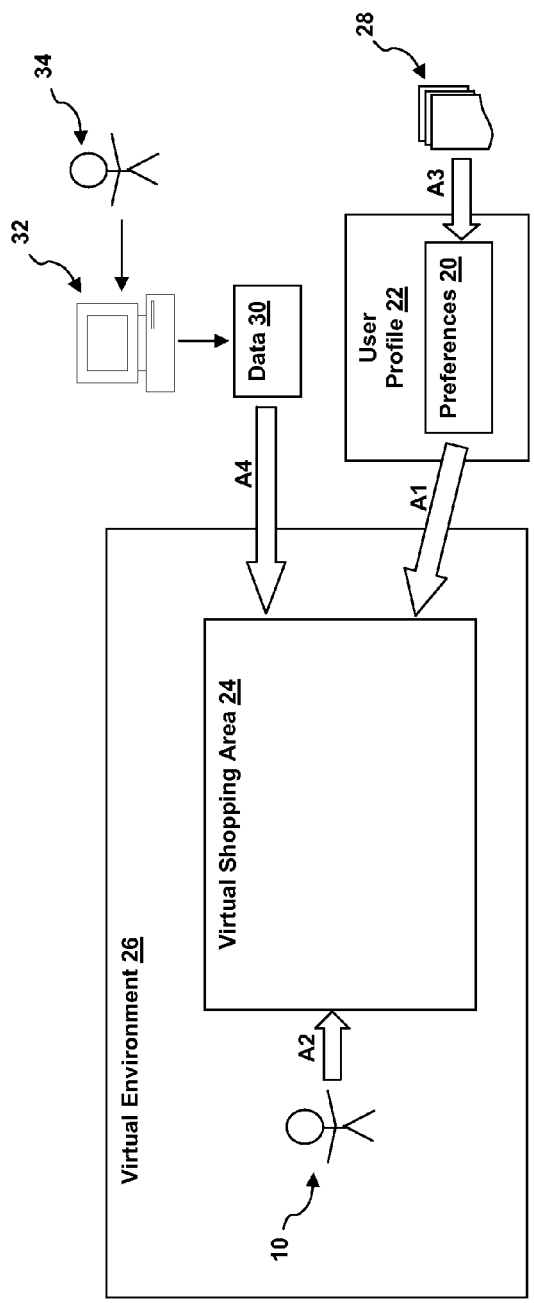
FIG. 3 is an illustrative hybrid system/process diagram depicting a dynamic virtual shopping area in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides a dynamic virtual shopping area based on user preferences and history. In the dynamic virtual shopping area, the items that an avatar is more interested in (or may be interested in) are presented to the avatar immediately upon entering the shopping area, without being intrusive.

By customizing the view of a shopping area presented to the avatar, the avatar is provided with a better shopping experience. An avatar does not need to trawl through the aisles of a store or shopping mall to find the articles that the avatar is most likely to purchase. From a cross-selling perspective, the ability to place likely products and services of interest to the avatar adjacent to the products that the avatar wants to buy provides an unobtrusive way of advertising those products.

User preferences stated through the use of questionnaires, or implicitly determined through either single or multi-vendor purchase history, and/or using other methodologies, are captured and used to establish the arrangement of a shopping area in a virtual environment. In this manner, the items that an avatar may be more likely to purchase are displayed to the avatar before those items that the avatar is less likely to purchase. For example, the items that are more likely to be purchased by an avatar can be displayed on shelves near the entrance of a store, while items that the avatar is less likely to purchase are placed farther back in the store. This is illustrated with reference to FIGS. 1A and 1B.

In FIG. 1A, a plurality of items, namely Item 1, Item 2, Item 3, Item 4, are displayed to an avatar 10 in a virtual store 12 in a conventional manner, without any concern to the shopping preferences of the avatar 10. As such, if the avatar 10 is most interested in Item 4, the avatar must walk to the rear of the store 12 to view Item 4. In FIG. 1B, however, the plurality of items have been arranged in accordance with an embodiment of the present invention such that the item the avatar 10 is most interested in (e.g., Item 4) is displayed near the entrance of the store 12, while the remaining items are displayed in descending order of interest to the avatar 10 (e.g., Item 2, Item 1, Item 3).

As another example, in FIG. 2A, a virtual mall 14 contains a plurality of stores, namely Store 1, Store 2, Store 3, Store 4, which are displayed to an avatar 10 in a conventional manner, without any concern to the shopping preferences of the avatar 10. As such, if the avatar 10 is most interested in shopping in Store 4, the avatar must walk to the rear of the mall 14 to enter Store 4. In FIG. 2B, however, the plurality of stores have been arranged in accordance with an embodiment of the present invention such that the store the avatar 10 is most interested in (e.g., Store 4) is displayed near the entrance of the mall 14, while the remaining stores are displayed in descending order of interest to the avatar 10 (e.g., Store 1, Store 3, Store 2). Further, the items within each of the stores can be arranged according to the preferences of the avatar 10, for example as depicted in FIG. 1B, such that the avatar 10 will first encounter Item 4 when entering Store 4.

In another embodiment, items and/or stores can also be placed in a virtual shopping area based on a price preference of the avatar. For example, items costing less than $100 (e.g., a price limit set by the avatar) and/or stores containing items costing less than $100, can be presented to the avatar before items costing more than $100.

Consider the example of an avatar that wishes to purchase clothes in a clothing store in a virtual environment. If the personal preferences of the avatar describe height, weight and color preferences, clothes that meet these preferences will be displayed at, or near, the entrance to the clothing store. Consider next the example of an avatar walking into an electronics store in a virtual environment. Again, if the personal preferences of the avatar indicate that the avatar is interested in, for example, DVDs and not VCR cassettes, DVDs will be presented to the avatar when first entering the electronics store, before VCR cassettes.

By correlating prior and current purchases with the preferences of an avatar, related items that may be of interest to the avatar can be displayed in adjacent shelves within a single store. This allows an avatar to browse collocated shelves in a store for related items that the avatar may wish to purchase without any advertising being pushed to the avatar. In this way, it is possible to cross-sell similar items without the need to pressure or otherwise hassle the avatar. Further, stores that may be of interest to an avatar can be collocated.

This present invention also includes the scenario of multiple avatars shopping together in a virtual environment. In this case, the union or intersection of avatars' preferences and past purchasing information can be used to determine what the store, departments, or mall will look like for the multiple avatars.

The present invention creates a dynamically customized shopping experience for an avatar based on the changing preferences of the avatar and/or end user controlling the avatar, as well as shopping history. These preferences can include, for example, what stores to include in the virtual shopping area, the order in which the stores appear, the merchandise included in the store, price range of included merchandise, the order in which merchandise is displayed within the store, and/or the like. Those skilled in the art will realize that other such options also exist.

In an embodiment, as depicted in FIG. 3, the preferences 20 can be defined in a user profile 22, which is read (A1) each time an avatar 10 enters (A2) a virtual shopping area 24 within a virtual environment 26. The preferences 20 can be provided (A3) through the use of questionnaires, single or multi-vendor purchase history, and/or using other methodologies, as represented by 28. Alternatively, and/or in addition, data 30 can be collected (A4) from the computer system 32 of the end user 34 controlling the avatar 10 and used to update and modify the virtual shopping area 24. Such computer based data may include internet cookies, log files, history files, electronic receipts, site log-ins, and/or other suitable data. In an embodiment, shopping frequency for specific item types, amount of money spent, length of time in store, and other such data can also be evaluated and used to customize a virtual shopping area.

As an example, the end-user 34 controlling the avatar 10 may purchase books on-line 60% of the time, hardware another 25% of the time, and finally music 15% of the time. When the avatar 10 enters a virtual shopping area 24, the layout depicted in FIG. 4 may be presented to the avatar 10, with the stores in the virtual shopping area 24 ordered based on at least one of the preferences 20 and data 30 of the end-user 32. Another avatar 10' entering the virtual shopping area 24 would be provided a differing view based on at least one of the preferences 20 and data 30 associated the end user controlling the avatar 10'. Additionally, when the avatar 10 enters the virtual shopping area 24 at a later point in time, the avatar 10 may be presented with a differing view (e.g., different arrangement of stores, items in stores, etc.) if at least one of the preferences 20 and data 30 have changed since the last shopping trip. As described above, if the avatars 10, 10' are shopping together, the union or intersection of the preferences 20 and/or data 30 of the avatars 10, 10' can be used to determine what the store, departments, or mall will look like for the avatars 10, 10'.

In an embodiment, the virtual shopping area 24 can be linked to a store used by the end user 34 for the goods being purchased. As an example, referring again to FIG. 4, when the avatar 10 enters the store "World of Books", this virtual store links to the end user's preferred source for books (e.g., Amazon.com), and the back-end payment process used by the avatar 10 would be similar to the end user's experience on the actual Amazon site. In another embodiment, entering "World of Books" would take the end user 34 to the Amazon.com log-in and place the end user 34 in the book section upon successful log-in. In yet another embodiment, the virtual shopping area 24 would be a service and would provide a layer of abstraction between the purchaser and the underlying product vendor(s). As an example, the service can process the end user's purchase and obtain the purchased goods from any number of product vendors based on current price, availability, and so forth.

Figure 5:
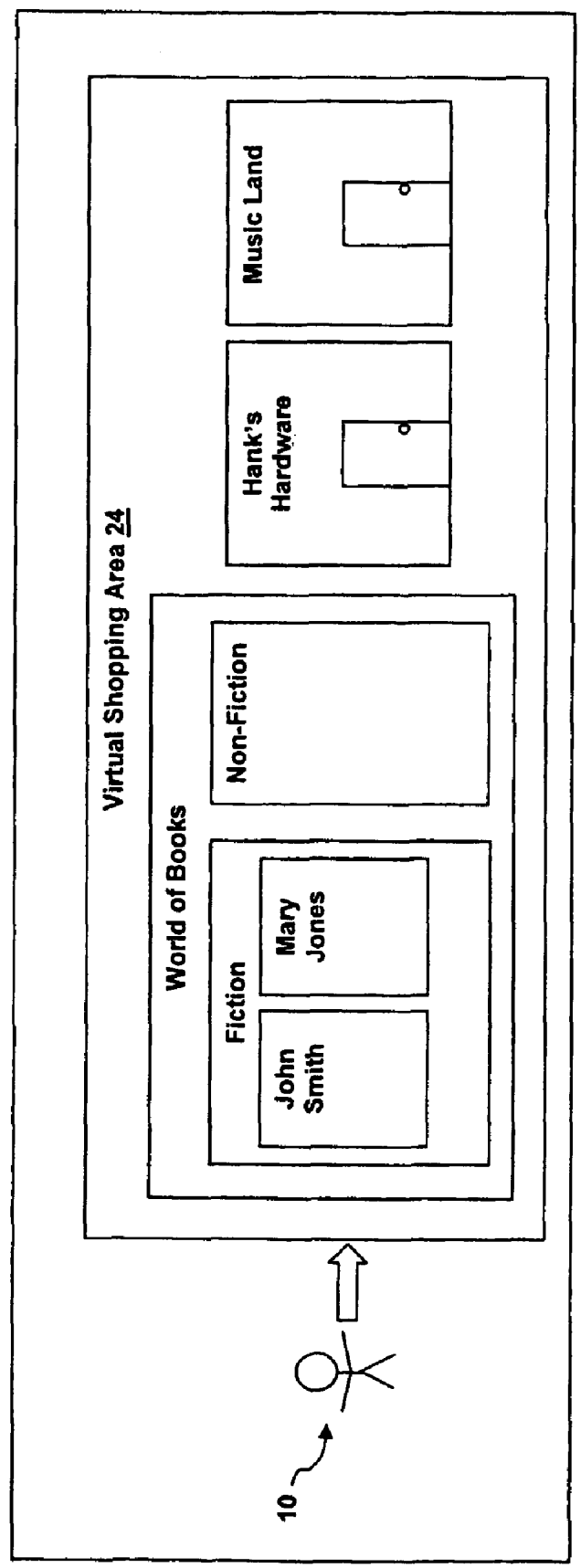
FIG. 5 depicts an illustrative dynamic virtual shopping area in accordance with an embodiment of the present invention.

Another aspect of the present invention is the dynamic customization of store content and merchandise based on at least one of the preferences 20 and data 30 of the end-user 34. Continuing with the previous example, as depicted in FIG. 5, when the avatar 10 enters the "World of Books" virtual store, the store layout and content are also customized for the individual end-user 34. The view presented in FIG. 5 is an illustrative result of the reading interests and/or shopping history of the end-user 34. In this example, the end-user 34 most often purchased fiction in general, and further, when shopping for specific fiction, purchased the most titles from author John Smith followed by Mary Jones. The resulting dynamic presentation of the "World of Books" virtual store provides ordered access to these products based on this information.

If the end-user 34 controlling the avatar 10 depicted in FIG. 5 normally purchases music and books in the same store, additional shopping rooms can be presented to the avatar 10, likewise organized by music type and artist. In another variation, the bookstore view would be presented along with a door to enter the music store. In another embodiment, every department and all merchandise may be presented and organized based on at least one of the preferences 20 and data 30 of the end-user 34. As an example, when the avatar 10 enters Hank's Hardware, if the end-user 34 happens to be a plumber and typically purchases plumbing supplies, the plumbing aisle would be presented in the forefront with the cascading rear aisles presented in descending order of relevance to plumbing, or based on other criteria.

The preferences 20, data 30, etc., of the end-user 34 can be stored, for example, on the server currently running the virtual environment 26 in which the avatar 10 resides. Alternatively, this information can be "portable," and uploaded from a personal computer or other server to a new retailer, such that the retailer could "pre-construct" the correct environment (e.g., virtual shopping mall, store, department, etc.) for an avatar 10 before that avatar 10 comes to visit.

A virtual shopping area 24 (e.g., shopping mall, store, department, etc.) can be built on top of a grid type of infrastructure of anchor points. This grid can include of the 'bare bones' of the virtual shopping area 24, which can be configured to meet the needs of an end-user 34. Consider, for example, a mall made up of these anchor points, such that the mall is initially empty. Using at least one of the preferences 20 and data 30 of the end-user 34, each empty slot in the mall can be populated with stores, each store can be populated with departments, each department can be populated with products, and so on. Other methodologies for constructing a virtual shopping area 24 are also possible.

Figure 6:
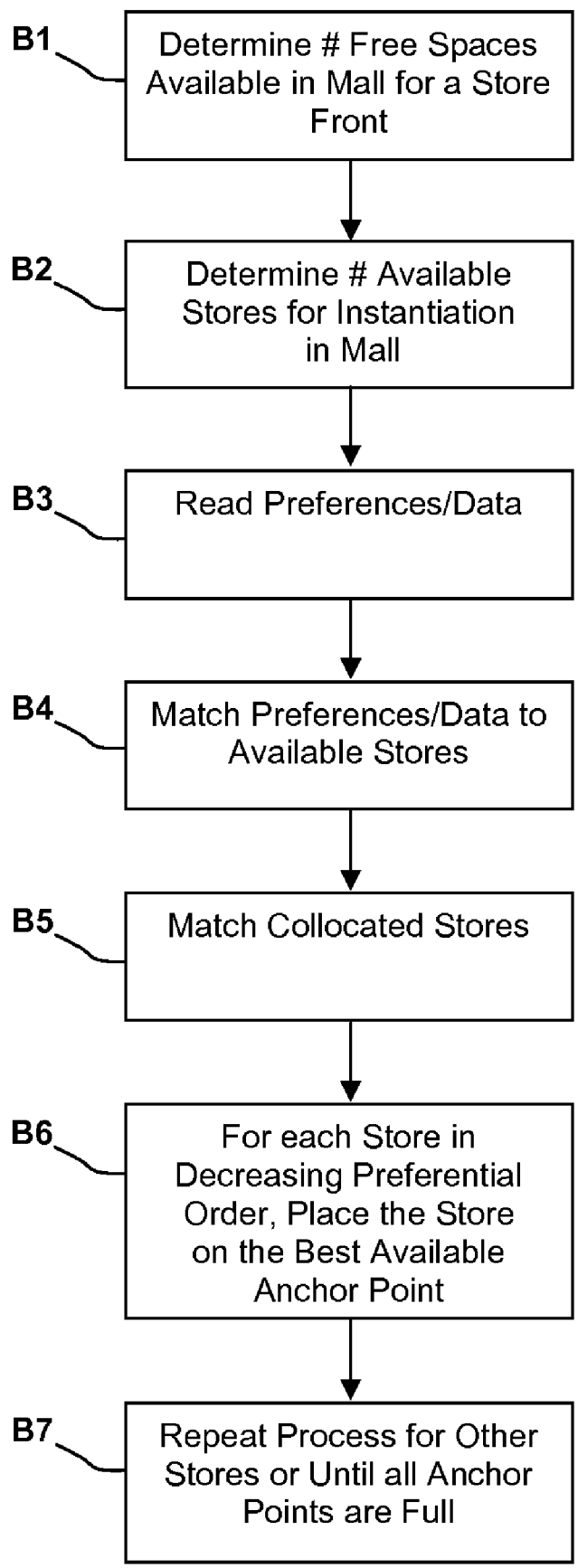
FIG. 6 depicts an illustrative process for populating a dynamic virtual mall in accordance with an embodiment of the present invention.

An illustrative process for designating which store should be populated onto which anchor point on the grid for a given avatar is as follows (see FIG. 6):

B1) Determine how many 'free' spaces are available in the mall for a store front.
B2) Determine how many stores are available for instantiation into the mall (it is possible that there will be more stores than there are spaces).
B3) Read the preferences/data of the avatar—taking into account stated preferences, past and current purchases, etc.
B4) Match the avatar preferences/data to an ordered list of stores that should be available in the mall.
B5) Match any stores that should be collocated with each other—for example, stores of the same kind or a store that can provide cross-selling to the avatar/end user.
B6) For each store in decreasing preferential order, place the store in the 'best available' anchor point in the mall. For stores that should be collocated, arrange the stores such that the collocation can occur if possible. If stores cannot be placed adjacent to one another, place the store in another strategic (e.g., easily visible) location.
B7) Repeat for the other stores until either there are no more stores left or all anchor points of the mall are full.

This process can be used to populate stores in a mall, departments in a store, items on shelves in a store, and so on. Note that the process can be expanded to take into account external factors such as (but not limited to):

1) Pricing—similar to how search engines on the internet move web pages higher up the search list if the company has paid a premium. In this case, stores which have paid a premium may have preferential placement such that it is higher up the priority list when placing stores in the mall.
2) Standard location—some stores may wish to always have the same location—especially large stores such that avatars always know where the store will be. This standard location may be determines at the time that the mall is created or based on a 'rental' charge to the mall for this preferred treatment.

Figure 7:
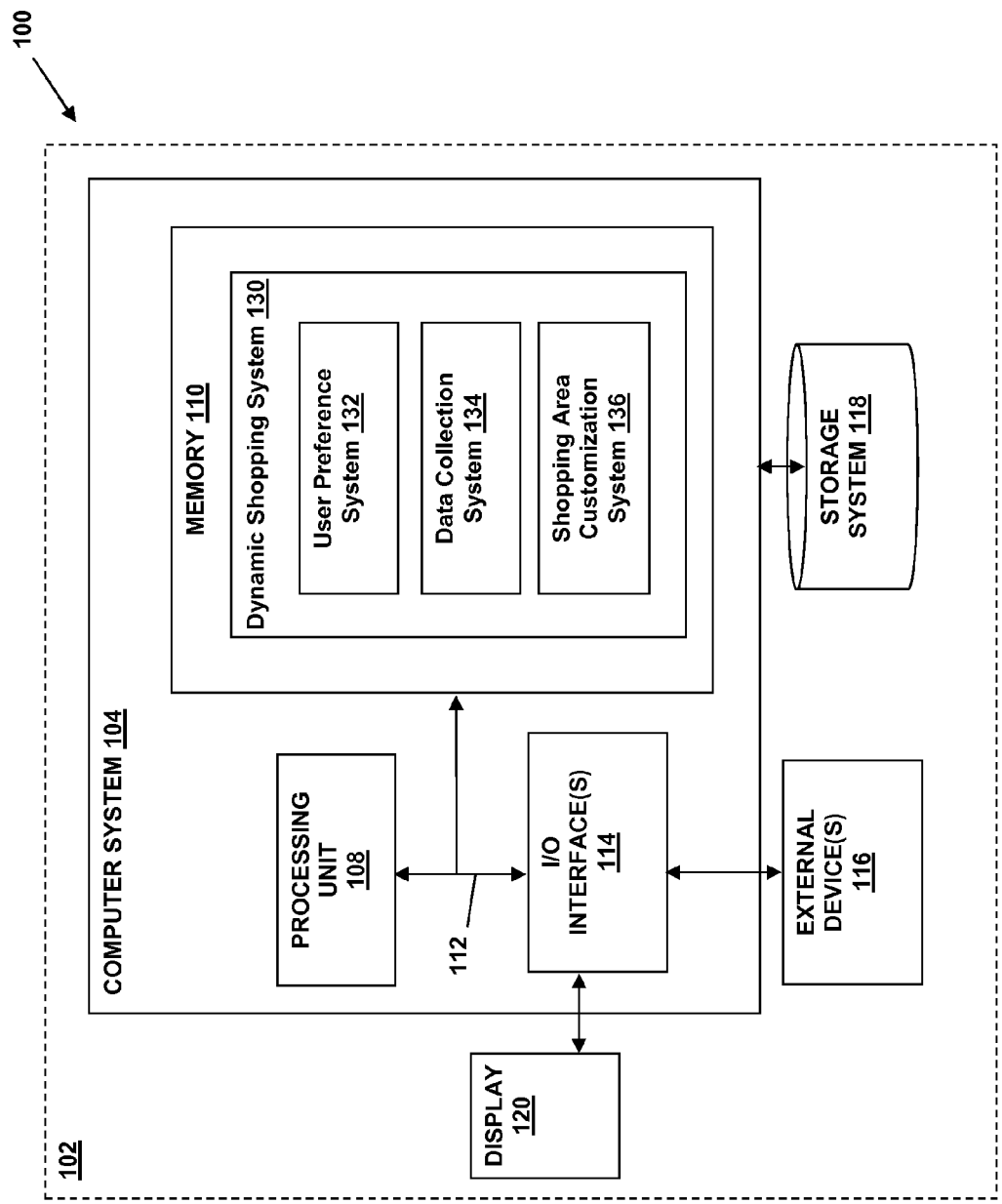
FIG. 7 depicts an illustrative computer system for implementing embodiment(s) of the present invention.

FIG. 7 depicts an illustrative system 100 for providing a dynamic virtual shopping area based on user preferences and history, in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as dynamic shopping system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The dynamic shopping system 130 is configured provide a dynamic virtual shopping area based on user preferences and history, as detailed above, in accordance with any/all embodiments of the present invention. For example, the dynamic shopping system 130 can comprise a user preference system 132 for capturing/determining user preferences based, for example, on questionnaires, vendor purchase history, etc., a data collection system 134 for collecting data from the computer system and/or the like of the end user controlling an avatar, and a shopping area customization system 136 for customizing a virtual shopping area.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

Figure 4:
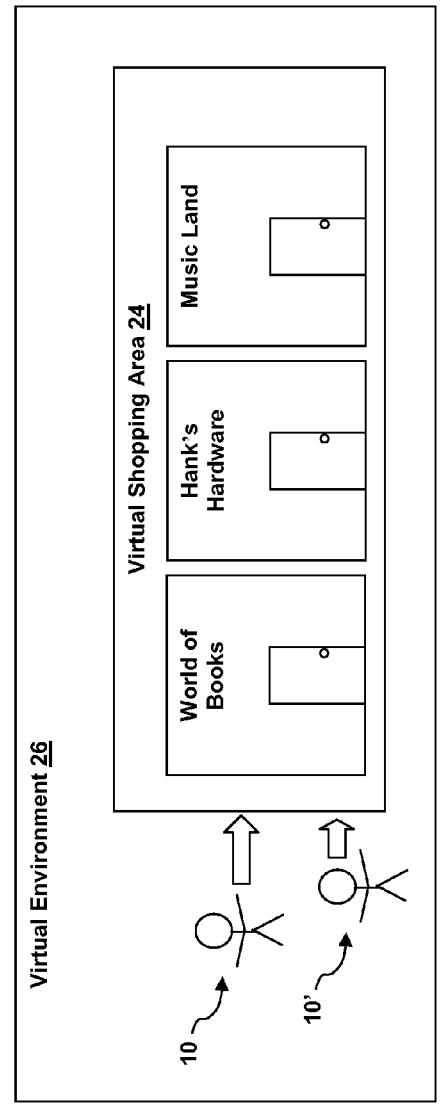
FIG. 4 depicts an illustrative dynamic virtual shopping area in accordance with an embodiment of the present invention.

It is understood that some of the various systems shown in FIG. 4 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for providing a dynamic virtual shopping area, comprising:

capturing user preferences; and dynamically customizing a virtual shopping area for an avatar of the user based on the user preferences using a computer, wherein items the avatar is more likely to purchase are displayed to the avatar before items the avatar is less likely to purchase, wherein the virtual shopping area comprises a virtual mall comprising a plurality of virtual stores, and wherein the plurality of virtual stores are arranged in the virtual mall such that a virtual store containing items the avatar is more likely to purchase is located near an entrance to the virtual mall, while a virtual store containing items the avatar is less likely to purchase is located farther inside the virtual mall and in response to changing the user preferences, arranging, in a different manner, the virtual stores in the virtual mall according to the change in user preferences.

2. The method of claim 1, wherein the user preferences are captured using at least one of a questionnaire, a shopping history, data from a computer system of the user controlling the avatar.

3. The method of claim 1, further comprising:
presenting related items of possible interest to the avatar adjacent to the items the avatar is more likely to purchase.

4. A system for providing a dynamic virtual shopping area, comprising:
a system including a computer configured for capturing user preferences; and
a system configured for dynamically customizing a virtual shopping area for an avatar of the user based on the user preferences wherein items the avatar is more likely to purchase are displayed to the avatar before items the avatar is less likely to purchase, wherein the virtual shopping area comprises a virtual mall comprising a plurality of virtual stores, and wherein the plurality of virtual stores are arranged in the virtual mall such that a virtual store containing items the avatar is more likely to purchase is located near an entrance to the virtual mall, while a virtual store containing items the avatar is less likely to purchase is located farther inside the virtual mall and wherein the plurality of virtual stores are arranged in a different manner if the user preferences have changed since the avatar last visited the virtual shopping area.

5. The system of claim 4, wherein the system for capturing user preferences captures the user preferences using at least one of a questionnaire, a shopping history, data from a computer system of the user controlling the avatar.

6. The system of claim 4, further comprising:
a system for presenting related items of possible interest to the avatar adjacent to the items the avatar is more likely to purchase.

7. A program product stored on a non-transitory computer readable storage medium, which when executed, provides a dynamic virtual shopping area comprising:
capturing user preferences; and
dynamically customizing a virtual shopping area for an avatar of the user based on the user preferences wherein items the avatar is more likely to purchase are displayed to the avatar before items the avatar is less likely to purchase and wherein the virtual shopping area comprises a virtual mall comprising a plurality of virtual stores, wherein the plurality of virtual stores are arranged in the virtual mall such that a virtual store containing items the avatar is more likely to purchase is located near an entrance to the virtual mall, while a virtual store containing items the avatar is less likely to purchase is located farther inside the virtual mall and wherein the plurality of virtual stores are arranged in a different manner if the user preferences have changed since the avatar last visited the virtual shopping area.

8. The program product of claim 7, wherein the user preferences are captured using at least one of a questionnaire, a shopping history, data from a computer system of the user controlling the avatar.

9. The program product of claim 7, further comprising program code for:
presenting related items of possible interest to the avatar adjacent to the items the avatar is more likely to purchase.

10. A method for deploying an application for providing a dynamic virtual shopping area, comprising:
providing a computer infrastructure;
capturing, by the computer infrastructure, user preferences; and
dynamically customizing, by the computer infrastructure, a virtual shopping area for an avatar of the user based on the user preferences using a computer wherein items the avatar is more likely to purchase are displayed to the avatar before items the avatar is less likely to purchase and wherein the virtual shopping area comprises a virtual mall comprising a plurality of virtual stores, wherein the plurality of virtual stores are arranged in the virtual mall such that a virtual store containing items the avatar is more likely to purchase is located near an entrance to the virtual mall, while a virtual store containing items the avatar is less likely to purchase is located farther inside the virtual mall and in response to changing the user preferences, arranging, in a different manner, the virtual stores in the virtual mall according to the change in user preferences.

* * * * *